UNITED STATES PATENT OFFICE.

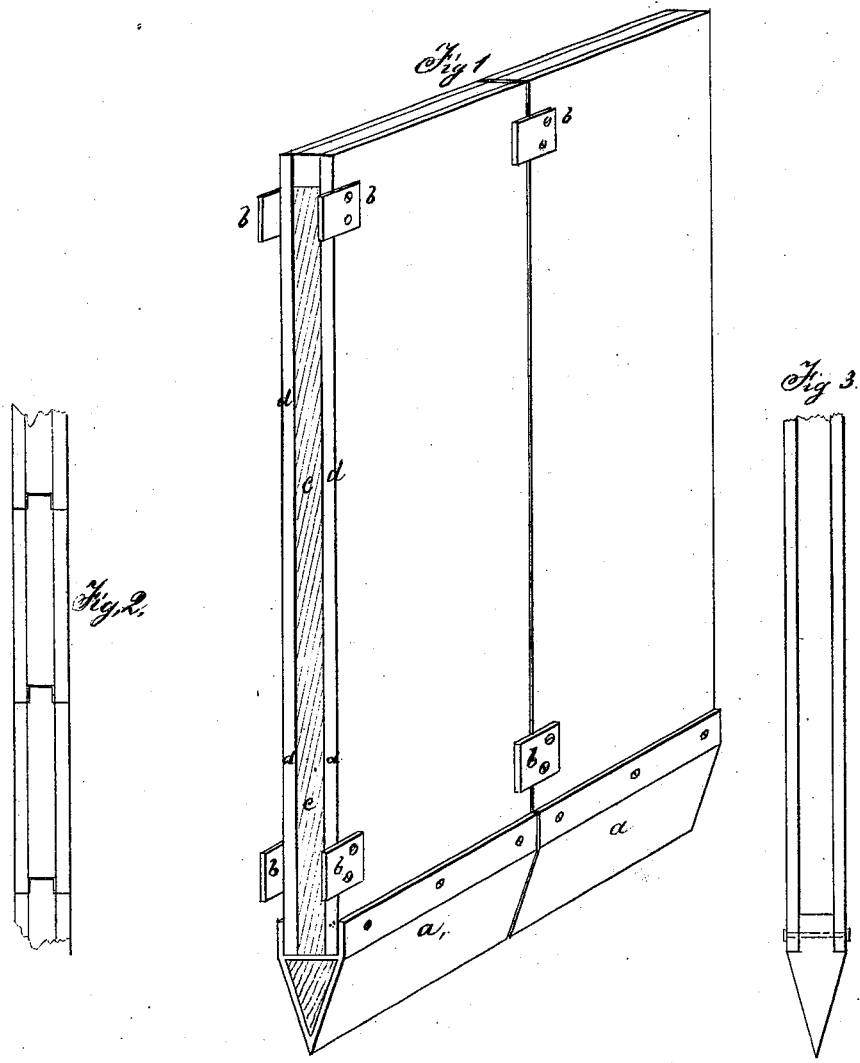

SMITH GARDNER, OF NEW YORK, N. Y., ASSIGNOR TO HIMSELF AND EPHRAIM HOWE, OF SAME PLACE.

IMPROVEMENT IN PROTECTING DIKES AND EMBANKMENTS AGAINST THE RAVAGES OF ANIMALS, &c.

Specification forming part of Letters Patent No. 107,608, dated September 20, 1870.

*To all whom it may concern:*

Be it known that I, SMITH GARDNER, of the city, county, and State of New York, have invented a new and valuable Improvement in the Construction of Dikes and Embankments, which renders them proof against the ravages of muskrats, crawfish, crabs, and other small animals; and I hereby declare that the following is a full, clear, and exact description of my said invention, reference being had to the accompanying drawing, and to the letters and figures marked thereon.

It is well known that dikes and embankments constructed of mold, clay, and other fine earthy substances along the banks of rivers and canals, or the low and marshy shores of seas and oceans, are very soon perforated by rats and other animals, and in a short time completely destroyed by them. To protect and secure such earth-works or dikes against the ravages of such animals, I sink into the ground or foundation upon which the dike is to be erected, in a vertical position, a series of concrete plates or slabs, extending along the whole length of the dike or embankment, made or composed of any substance or composition of matter which is durable and will concrete or solidify into a mass so hard or tenacious as to be impervious to these animals, or any other which penetrate and destroy such earth-works or dikes. I prefer for this purpose slabs or plates made of hydraulic lime or cement mixed with sand and mortar in such proportions as to attain the greatest strength and durability. They can be made of hydraulic cement without the admixture of sand, but not so economically as with it. Concrete slabs or plates for this purpose may be made of asphaltum, coal-tar, or almost any other pitchy substance, boiled down to the right consistency, and mixed with sand or gravel, or both, and molded or formed when the pitch is hot. The slabs are made about an inch and a half thick, and of any convenient width and required length. I find, however, that about two feet is the most desirable width for them. The edges of the slabs constituting the series are fitted snugly together and stand in the ground parallel one with the other. The lower ends extend down five or six inches below the surface of the water at low tide. The upper ends project up about one foot above the high-water line or mark, and are surrounded or inclosed in the embankment, as shown in the drawings, Fig. 4. The slabs are formed or shaped in molds while the concrete of which they are composed is in a plastic state. They remain in the molds when they are set in the ground, and are never removed or separated from them until they rot away. The molds are made of boards, which are about half an inch thick. The lower ends of them, or the ends intended to be pressed down into the ground, are armed with iron shoes, formed or shaped like a wedge, split and spread open at the head or thick end. The end of the mold enters this opening, and is secured to the shoe by means of screws or rivets, as shown in the drawings.

Figure 1 represents a perspective view of two slabs or plates in the molds where they are formed, with the edges joined or united in the manner they are when set in the ground. *a a* represent the iron shoe secured to the end of the mold. *b b b b b b* represent guides secured to the molds near the edges, and projecting out about one inch beyond them, by means of which the slabs can be set in the ground parallel to each other without difficulty. As a substitute for the guides, the slabs may be made with tongues and grooves, in the manner shown in an end view of a series marked Fig. 2 in the drawing. *c c* represent an edge view of a slab in the mold in which it is formed, and *d d* the edge of the mold. The edges of the slabs are never covered by the molds when they are placed in the ground. A solid block of hard wood, shaped and fitted to the mold in the manner shown in the drawings, Fig. 3, may be used as a substitute for the iron shoe.

Fig. 4 in the drawing represents a profile view of a dike erected to prevent the submersion of marshy lands by tidal waters, in the construction of which concrete slabs are used. F F represent the land or marsh to be protected by the dike, and G G the sea or tide-water; H, the water at high tide, and I at low tide. J J represent the earth-work of the dike, and K an edge view of one of the concrete slabs or plates which constitute the series in the dike. Concrete slabs or plates constructed in the manner and form herein described, and the molds or cases in which they are formed and remain, may be pressed or forced down into the dike or ground where the dike is to be made by means of a screw or any other convenient mechanical device or apparatus.

I am aware that iron plates or slabs are successfully used in the construction of dikes and embankments to accomplish the same object that I propose to accomplish by the introduction and use of concrete. Concrete, especially when composed of hydraulic cement, with or without the admixture of sand, is much cheaper and much more durable for the purposes herein contemplated than iron, and therefore much preferable to it.

What I claim as my invention, and desire to obtain Letters Patent for, is—

1. The mode herein described for protecting dikes, the same consisting in the introduction into the dike of slabs of concrete, substantially as set forth.

2. The improved slabs for protecting dikes herein described, the same consisting of walls $d\ d$, inclosing a core or center of concrete or cement, substantially as set forth.

3. A slab for forming dikes, composed of the shoe $a$, the guides $b\ b$, core of concrete $c$, and mold-boards $d\ d$, or their substantial equivalents, all arranged and so combined as to operate as described.

4. A concrete core for dikes, in sections or slabs, in the manner described, or in any other equivalent manner.

SMITH GARDNER.

Witnesses:
A. H. WILSON,
ALBERT H. HOUK.